United States Patent [19]

Goldberg et al.

[11] 4,272,584

[45] Jun. 9, 1981

[54] PLATABLE HIGH HEAT ABS RESINS AND PLATED ARTICLES MADE THEREFROM

[75] Inventors: Gerald Goldberg, Parkersburg; Charles L. Myers, Vienna, both of W. Va.; Charles F. Parsons, Little Hocking, Ohio; William Steffancin, Parkersburg, W. Va.

[73] Assignee: Borg-Warner Corporation, Chicago, Ill.

[21] Appl. No.: 85,362

[22] Filed: Oct. 16, 1979

[51] Int. Cl.$^3$ .................... B32B 27/28; B32B 27/06; B32B 15/08

[52] U.S. Cl. .................................. 428/412; 428/447; 428/463; 427/306; 427/307; 260/42.48; 525/86; 525/100; 525/238; 525/316

[58] Field of Search .............. 525/86, 100, 238, 316, 525/232, 64, 315, 295; 260/42.48, 42.43, 29.6 RB, 29.1 B; 428/412, 447, 463; 427/306, 307

[56] References Cited

U.S. PATENT DOCUMENTS

| | | |
|---|---|---|
| 3,010,936 | 11/1961 | Irvin . |
| 3,046,239 | 7/1962 | Calvert . |
| 3,111,501 | 11/1963 | Thompson . |
| 3,445,350 | 5/1969 | Klinger et al. . |

FOREIGN PATENT DOCUMENTS

| | | |
|---|---|---|
| 441164 | 6/1970 | Australia . |
| 4929947 | 8/1974 | Japan . |

*Primary Examiner*—Ralph S. Kendall
*Attorney, Agent, or Firm*—William S. McCurry

[57] ABSTRACT

A metal platable high heat ABS resin containing alkyl substituted silicone polymers and, optionally, up to 35% by weight of a bis-phenol polycarbonate and plated parts made therefrom.

10 Claims, No Drawings

PLATABLE HIGH HEAT ABS RESINS AND PLATED ARTICLES MADE THEREFROM

BACKGROUND AND SUMMARY OF THE INVENTION

The present invention relates to metal plated high heat ABS articles prepared from injection molded substrates which contain substantial amounts of alphamethyl styrene and which also contain a small amount of an alkyl substituted silicone polymer. The plated articles of the present invention have both excellent heat deflection properties and thermal cycle properties.

"High Heat ABS" materials have been available for molding applications since the early 1960's. Such materials are usually blends of alphamethyl styrene-acrylonitrile polymers and ABS graft polymers and are disclosed, for example, in U.S. Pat. Nos. 3,010,936 and 3,111,501. The alphamethyl styrene-acrylonitrile polymer imparts improved dimensional stability at elevated temperatures because of its higher glass transition temperature compared to the styrene-acrylonitrile copolymer of "Standard ABS" materials. In order for the practical use temperature range, or the ASTM heat deflection temperature, to be significantly higher than "Standard ABS," the level of incorporation of alphamethyl styrene must be very high. For example, to attain a 212° F. heat deflection temperature at 264 psi using a ½×½ inch, unannealed, compression molded specimen in the ASTM D-648 test, about 35% of the total polymer or 40% of the copolymer (non-rubber) portion must consist of alphamethyl styrene. Commercial materials having 221° F. ASTM heat deflection values may have 45% or more alphamethyl styrene content. The "high heat ABS" materials would be expected to deviate from simple analogies to standard ABS made with styrene-acrylonitrile copolymer. Alphamethyl styrene exhibits very different polymer chemistry than styrene because of its disubstituted olefinic nature. This affects both effective synthesis techniques and polymer properties. For example, styrene-acrylonitrile copolymer deviates positively from the Fox equation glass transition temperature vs. composition prediction, whereas alphamethyl styrene-acrylonitrile copolymer shows a large negative deviation.

It is not surprising, therefore, that no successful plating grade high heat ABS, having a heat deflection temperature above 212° F. and capable of passing automotive industry thermal cycle tests, has been invented, even though standard ABS grades have been available for several years which can meet such tests. In fact, early high heat ABS plating grades with a 220° heat deflection temperature have been suggested (U.S. Pat. No. 3,445,350) and tried, but were not successful in thermal cycle tests of injection molded parts. Alloys or blends of high heat ABS and polycarbonate have also been commercially available and are well known. See, for example, Australian Pat. No. 441,164. The metal plating of such alloys was also suggested in U.S. Pat. No. 3,445,350. However, such materials were not capable of passing automotive thermal cycle tests, in which failures occur at low temperatures.

The use of silicone additives to improve the impact strength of graft ABS is disclosed in U.S. Pat. No. 3,046,239. In this patent, alphamethyl styrene is disclosed as a comonomer in the graft ABS. However, there is no disclosure of metal plating the ABS, nor the effect of such additives on the thermal cycle performance of metal plated high heat ABS. Further, the use of organosilicones in standard ABS resins to permit lower amounts of organo metallic soaps used as lubricants in the resin system is taught by Japanese publication 49-29947.

A high heat ABS material, or family of materials, including ABS/Polycarbonate alloys, would extend the useful range of plated part performance to higher temperatures. This would be of use in the plating operation where some parts distort in the 160° F. plating etch bath, causing misfits in assembly. The plated part would also be useful at higher temperatures, such as encountered in touch-up ovens. This would eliminate or reduce the need for insulating devices during touch-up painting.

GENERAL DESCRIPTION OF THE INVENTION

The present invention, therefore, relates to metal plated parts having improved thermal cycle performance prepared from a blend having a heat deflection temperature of at least 212° F. at 264 psi containing (1) a high heat ABS resin, (2) certain alkyl substituted silicone polymers, and (3) optionally, up to 35% polycarbonate. Additives such as stabilizers, antioxidants, internal and external lubricants as commonly employed in the art for high heat ABS and/or polycarbonate-high heat ABS blends may also be added.

The high heat ABS resin is prepared by latex or melt blending or by multistage reactions, consisting of: (a) an alphamethyl styrene copolymer containing at least 50% alphamethyl styrene by weight and at least 20% acrylonitrile by weight and no more than 15% of other third monomer, such as styrene; (b) a graft polymer prepared by reacting, in the presence of a diene rubber (e.g. polybutadiene), a monomer mixture consisting of 20%–40% acrylonitrile and correspondingly 80%–60% styrene or substituted styrene. The total alphamethyl styrene content of the high heat ABS resin must be at least 35%. The diene rubber (e.g. polybutadiene) content of the graft component (b) must be at least 25% by weight. The diene rubber content of the high heat ABS resin may be 10% to 25% of the final mixture.

The alkyl substituted silicone polymer is a siloxane polymer of the following structure

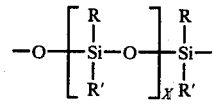

where R and R' are hydrogen, methyl or other alkyl. Up to 20% of R and/or R' may be aryl or polar substituted alkyl (e.g. cyanoalkyl). Dow Corning 200 fluid, a poly(dimethyl siloxane), works well in this invention and is the least expensive silicone type. Viscosity of the silicone polymer may be from 200 centistokes to 100,000 centistokes or higher. The structure of the silicone is more important than viscosity.

The polycarbonate used optionally in blends of the present invention is a polycarbonate of the bis-phenol type, such as Merlon ® M-50, Merlon ® M-39 or Lexan ® 141. Substituents on the aromatic moieties of the polycarbonate, such as halogens, may be expected to improve compatibility of the polycarbonate with high heat ABS, but are not necessary.

Other additives commonly employed in compounding, molding and stabilization of high heat ABS may be incorporated. These include antioxidants (such as hindered phenols, triaryl phosphites, dilauroylthiodipropionate and the like) and lubricants (such as stearates, stearamides and the like). Such additives should not exceed 5% of the total composition and should be employed at the minimum satisfactory level to avoid plasticization of the high heat ABS.

Plated parts may be prepared from molded specimens by a variety of commonly employed processes for "chrome plating" of ABS. Such processes generally involve an etching step with chromic/sulfuric acid, a catalyst deposition step in which palladium is deposited on the plastic surface, and an electroless deposition step in which the part is coated with a conductive layer of copper or nickel. The part is then plated electrolytically with one of a number of metal sequences before a chrome layer is applied. For a complete teaching of the process, see U.S. Pat. No. 3,445,350. In plating of ABS and high heat ABS, the most common problems causing rejection of potential materials for use in parts to be plated for automotive applications are blistering and cracking during thermal cycle tests. Blistering is typified by separation of the metal plate and adhering plastic from the bulk of the plastic substrate. Often an obvious bubble or "blister" is observed. Cracking is typically a failure of the substrate plastic in which a crack has propagated through the body of the plastic part, with or without a corresponding crack in the metal plate. Both modes of failure may be related to differential expansion and contraction of the plate and the substrate, ductility of the substrate, adhesion of the plate to the substrate, and to orientation and stresses incorporated in the plastic during the molding process. The blistering and cracking phenomena are induced by thermal cycling. The common automotive thermal cycle tests are run with temperature extremes of 180° F. to −20° F. or −30° F. and may be repeated several times per test part to prove satisfactory performance.

SPECIFIC DESCRIPTION OF THE INVENTION

The High Heat ABS

The high heat ABS of the present invention is prepared in accordance with the process described in U.S. Pat. Nos. 3,010,936 and 3,111,501. A specific high heat ABS (ABS I) is prepared from a blend of 23.5 parts of a graft ABS polymer prepared by polymerizing 28 parts of styrene and 12 parts of acrylonitrile in the presence of 60 parts polybutadiene blended with 76.5 parts of terpolymer containing 66% alphamethyl styrene, 3% styrene and 31% acrylonitrile. High heat ABS I thus contains 14% polybutadiene, 51% alphamethyl styrene, 26% acrylonitrile and 9% styrene. High heat ABS II was prepared by utilizing 30 parts of the aforedescribed graft ABS and 70 parts of the terpolymer, and high heat ABS III was prepared by blending 36.5 parts of the graft ABS polymer with 63.5 parts of terpolymer.

The Polycarbonate

The preferred polycarbonate of the present invention is made by converting di-(mono-hydroxyphenyl)-substituted aliphatic hydrocarbons with phosgene in a manner well known in the art. The particular polycarbonate used in certain of the examples hereinafter was Merlon ® M-50 manufactured by Mobay Chemicals Co.

The Silicone Polymer

The specific silicone polymer utilized in the examples was a poly(dimethyl siloxane) obtained from Dow Corning and identified as DC200 fluid.

EXAMPLES

High heat ABS I was utilized in preparing the following examples. The ingredients were formulated by Banbury mixing at 300° F. for two minutes, milling from on a two roll mill at 350° F. for one minute, cooling to ambient temperature and pelletized in a Cumberland grinder.

TABLE I

| Example | High Heat ABS I (parts) | Magnesium Stearate | Calcium Stearate | Dow Corning 200 Fluid 1000 Centistokes |
|---|---|---|---|---|
| 1 | 100 | 0.50 | 0 | 0 |
| 2 | 100 | 0.50 | 0 | 0.10 |
| 3 | 100 | 0 | 0.50 | 0 |
| 4 | 100 | 0 | 0.50 | 0.10 |
| 5 | 100 | 0 | 0.50 | 0.20 |

The pellets were injection molded into escutcheons using a 2 second fill speed, 530° F. stock temperature, and 180° F. cavity temperature on a screw type injection molding machine. The escutheon is an oblong part 0.090 inches thick, 2.17 inches wide and 7.19 inches long with a smooth surface on one side, a ribbed surface on the other side and a center hole of 1.14 inches diameter. The part is end gated. The parts were treated for plating in a Borg-Warner Chemicals E-22 medium chromic acid etchant system. The electroless plating system included a Dri-Cat ® 3 catalyst, Borg-Warner Chemicals D-270 neutralizer and electroless nickel. The electrolytic sequence was semibright nickel, copper, semibright nickel, bright nickel and chrome.

Etch times of 4, 8 and 12 minutes were used. Six parts of each material were thermal cycled according to the Ford Motor Company requirements for automotive exterior applications. The thermal cycle testing for the 180° F. temperature was in an oven maintained at 180° F. with the escutcheons placed in the oven on a rack; the 73° F. cycle was at ambient or room temperature and the cycle for the −30° F. test was a racked chamber maintained at −30° F. with liquid nitrogen. The cycle was: 73° F. to 180° F., 2 hours at 180° F., 180° F. to 73° F., 1 hour at 73° F., 73° F. to −30° F., −30° F. for 2 hours, −30° F. to 73° F., 73° F. for 1 hour. This cycle was repeated three times. The materials were ranked according to the average number of defects per part, blisters and cracks. The number of defects was counted by placing a transparent grid of ½×½ inch squares over the part, on the smooth side, and counting the number of grid squares containing a defect of each type. This method weighs both the number and severity of defects. The results of the thermal cycle test are shown below in Table II.

TABLE II

| | 4 Minutes Etch | | 8 Minutes Etch | | 12 Minutes Etch | |
|---|---|---|---|---|---|---|
| Example | Blisters | Cracks | Blisters | Cracks | Blisters | Cracks |
| 1 | Severe | | Severe | | Severe | |
| 2 | 0 | 0.5 | 0 | 1.7 | 0 | 0.5 |
| 3 | Severe | | Severe | | Severe | |
| 4 | 0 | 2.5 | 0 | 0 | 0 | 0 |
| 5 | 0 | 4.0 | 0 | 3.0 | 0 | 0 |

Note that Examples 1 and 3, without the silicone additive, were severely blistered and cracked.

These results show that the materials of the present invention, high heat ABS with silicone fluid, produce improved plated part thermal cycle performance compared to high heat ABS without silicone.

EXAMPLES 6-8

High heat ABS I resin was compounded with 0, 0.1 and 0.3 parts per 100 resin of Dow Corning 200 fluid, 1000 centistokes, by the same procedure as used in Examples 1-5. The materials were milled on a two roll mill and compression molded to obtain physical property test specimens. Samples were injection molded into escutcheons, plated and thermal cycled as in Examples 1-5. Six escutcheons of each material were tested.

TABLE III

|  | Example 6 | Example 7 | Example 8 |
|---|---|---|---|
| High Heat ABS I, parts | 100.00 | 100.0 | 100.0 |
| Silicone, DC 200, parts | 0 | 0.1 | 0.3 |
| Physical Properties |  |  |  |
| Tensile Strength, psi | 6150 | 5650 | 5650 |
| Tensile Modulus, psi $\times 10^{-5}$ | 3.2 | 3.2 | 3.2 |
| Elongation at break, % | 5.5 | 45 | >50 |
| Notched Izod Impact, ft lb/in | 4.2 | 4.9 | 5.1 |
| Linear Coefficient of Thermal Expansion, in/in ° C. $\times 10^5$ | 8.4 | 7.0 | 7.2 |
| Plated Part Thermal Cycle Test |  |  |  |
| (average defects per specimen) |  |  |  |
| Six Minute Etch |  |  |  |
| Blisters | Severe Fail | 5.33 | 5.0 |
| Cracks | Severe Fail | 5.33 | 9.33 |
| Eight Minute Etch |  |  |  |
| Blisters | Severe Fail | 1.0 | 0 |
| Cracks | Severe Fail | 0 | 0 |

Examples 6-8 inclusive show that the use of silicone fluid in high heat ABS converts a material otherwise useless for plated automotive parts to a material which is commercially useful in plating grade products.

EXAMPLES 9-11

The following three high heat ABS blends, Examples 9-11, were injection molded into escutcheons. Three samples of each Example were sent to McGean Chemical Company for plating in a commercial chrome plating system, which system is similar to the plating system used in Examples 1-5. The materials were then tested by the thermal cycle test described in Examples 1-5. All three materials passed with no cracks or blisters.

These Examples show that the high heat ABS materials of this invention, having 14% to 22% diene rubber, will pass automotive thermal cycle tests.

Physical properties of these materials are indicated in the following Table. The heat deflection advantage of the high heat ABS materials is 20°-30° F. better than standard ABS plating grades.

TABLE IV

|  | Example 9 | Example 10 | Example 11 |
|---|---|---|---|
| Composition |  |  |  |
| High Heat ABS I | 100.0 |  |  |
| High Heat ABS II |  | 100.0 |  |
| High Heat ABS III |  |  | 100.0 |
| Rubber Content, % | 14 | 18 | 22 |
| Ethylene Bis-stearamide wax | 1.0 | 1.0 | 1.0 |
| Magnesium Stearate | 0.5 | 0.5 | 0.5 |
| DC 200 Fluid, 1,000 cs | 0.5 | 0.5 | 0.5 |
| Properties (not plated) | 0.1 | 0.1 | 0.1 |
| Notched Izod Impact, ft lb/in, CM | 4.0 | 4.5 | 4.8 |
| Notched Izod Impact, ft lb/in, IM | 4.8 | 5.1 | 5.0 |
| Rockwell Hardness, CM | 105R | 103R | 101R |
| Heat Deflection Temperature 264 psi, °F. |  |  |  |
| ½ × ⅛ inch, IM | 197 | 202 | 193 |
| ½ × ⅛ inch, CM | 222 | 219 | 217 |
| ½ × ⅛ inch, CMA | 240 | 237 | 234 |
| Gardner Impact, ft. lb, IM | 10-12 | 22-24 | 20-26 |
| Tensile Strength, psi, IM | 6000 | 5800 | 5600 |
| Elongation at break, %, IM | 55 | 80 | 70 |
| Tensile Modulus, psi $\times 10^{-5}$, IM | 3.3 | 3.1 | 3.0 |

TM = Injection Molded
CM = Compression Molded
A = Annealed

EXAMPLES 12-15

High heat ABS I resin was compounded with and without silicone fluid, both with and without polycarbonate, as in the following Table. Materials were compounded by Banbury mixing at 360° F., milling, and pelletizing the mill sheet.

TABLE V

|  | Examples | | | |
|---|---|---|---|---|
|  | 12 | 13 | 14 | 15 |
| High Heat ABS I | 100 | 100 | 80 | 80 |
| Polycarbonate | — | — | 20 | 20 |
| Tris(nonylphenyl)phosphite | — | — | 0.25 | 0.25 |
| Polyethylene Wax | — | — | 1.0 | 1.0 |
| Magnesium Stearate | 0.5 | 0.5 | — | — |
| Ethylene Bis - stearamide wax | 1.0 | 1.0 | — | — |
| DC 200 Fluid, 1000 CS | 0 | 0.1 | 0 | 0.1 |

The materials were injection molded into escutcheons for thermal cycle testing using several molding conditions. Stock temperature and fill speed were the molding variables. Data for the molding conditions and thermal cycle testing are indicated in the following Table VI:

TABLE VI

| Example | Stock Temperature, °F. | Fill Speed, Seconds | Thermal[a] Cycle Failures | Cracking | Warping (Through Plating) |
|---|---|---|---|---|---|
| 12 | 475 | 3 | 75% | No | Yes |
|  |  | 7 | 20% | No | Slight |
|  | 505 | 1 | 100% | Yes | Yes |
|  |  | 3 | 75% | No | Yes |
|  |  | 7 | 10% | No | No |
|  | 550 | 1 | 90% | Yes | Yes |
|  |  | 3 | 10% | No | No |
|  |  | 7 | 10% | No | No |
| 13 | 475 | 1 | 0 | No | No |
|  |  | 3 | <10% | No | No |
|  |  | 7 | 0 | No | No |
|  | 500 | 1 | 0 | No | No |
|  |  | 3 | 0 | No | No |
|  |  | 7 | 0 | No | No |
|  | 550 | 1 | 0 | No | No |
|  |  | 3 | 0 | No | No |
|  |  | 7 | <10% | No | No |
| 14 | 480 | 1 | 20% | No | No |
|  |  | 3 | 0 | Yes | Yes |

TABLE VI-continued

| Example | Stock Temperature, °F. | Fill Speed, Seconds | Thermal[a] Cycle Failures | Cracking | Warping (Through Plating) |
|---|---|---|---|---|---|
|  |  | 7 | 0 | No | No |
|  | 500 | 1 | 20% | Yes | Yes |
|  |  | 3 | 0 | No | No |
|  |  | 7 | 0 | No | No |
|  | 550 | 1 | 0 | Yes | Yes |
|  |  | 3 | 0 | No | No |
|  |  | 7 | 0 | No | No |
| 15 | 475 | 1 | 0 | No | No |
|  |  | 3 | 0 | No | No |
|  |  | 7 | 0 | No | No |
|  | 500 | 1 | 0 | No | No |
|  |  | 3 | 0 | No | No |
|  |  | 7 | 0 | No | No |
|  | 550 | 1 | 0 | No | No |
|  |  | 3 | 0 | No | No |
|  |  | 7 | 0 | No | No |

[a]Thermal cycle failures: percent of surface area covered by blisters, average of 4 specimens.

The beneficial effect of the silicone in improving the thermal cycle performance is very apparent at all molding conditions for the high heat ABS. Compare, for example, the above data for Examples 12 and 13.

The beneficial effect of the silicone in improving thermal cycle performance of the high heat ABS/polycarbonate alloy is evident at the lower molding temperature with the fast fill speed. It is known in the art of molding parts for plating that fast fill speeds and low stock temperatures are both adverse for plated part thermal cycle performance. The silicone renders the high heat ABS/polycarbonate alloy less sensitive to molding conditions and therefore an improved material. Note the data for Examples 14 and 15.

In the preparation of the high heat ABS utilized in the present invention, the acrylonitrile of the copolymer and of the graft polymer may be replaced with methacrylonitrile; the styrene of the graft polymer may be replaced with other monovinyl aromatic hydrocarbons such as alphamethyl styrene, vinyl toluene or alphamethyl vinyltoluene; and the polybutadiene rubber may be replaced by other diene rubbers such as butadiene-styrene polymers and butadiene-acrylonitrile polymers.

Further, while from 0.1 to 0.3 parts of siloxane polymer was used in the Examples, it is understood that from 0.05 to 0.5 parts can be used with effective results.

We claim:

1. A composition of matter adapted for use as a substrate for metal plate articles of manufacture comprising from 65 to 100 parts by weight of (a) a high heat ABS blend having a heat deflection temperature at 264 psi of at least 234° F. of a compression molded ½"×½" annealed specimen under ASTM test D-648 and comprising (1) an alphamethyl styrene copolymer containing at least 50% alphamethyl styrene by weight and at least 20% acrylonitrile by weight and (2) a graft polymer prepared by reacting a monomer mixture of from 20-40% acrylonitrile by weight and correspondingly from 80-60% of a monovinyl aromatic hydrocarbon by weight in the presence of a diene rubber, the alphamethyl styrene content of said blend of (1) and (2) being at least 35% by weight, (b) from 35 to 0 parts by weight of a polycarbonate and (c) from about 0.05 to 0.5 parts of a siloxane polymer having a viscosity of from 200 to 100,000 centistokes and having the following structure:

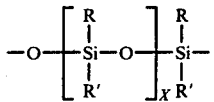

where R and R' are hydrogen, methyl or other alkyl.

2. A composition of matter in accordance with claim 1, wherein the alphamethyl styrene copolymer contains about 66% by weight alphamethyl styrene, about 3% by weight styrene and about 31% by weight acrylonitrile.

3. A composition of matter in accordance with claim 1, wherein the graft polymer contains about 60% polybutadiene rubber, about 28% styrene and about 12% acrylonitrile.

4. A composition of matter in accordance with claim 1, wherein the alphamethyl styrene copolymer contains about 66% by weight alphamethyl styrene about 3% by weight styrene and about 31% by weight acrylonitrile, and the graft polymer contains about 60% by weight polybutadiene, about 28% by weight styrene and about 12% by weight acrylonitrile.

5. A composition of matter in accordance with claim 1, wherein the siloxane polymer is poly(dimethyl siloxane).

6. A metal plated article of manufacture capable of passing thermal cycles of from 180° F. to −30° F. comprising from 65 to 100 parts by weight of (a) a high heat ABS blend having a heat deflection temperature at 264 psi of at least 234° F. of a compression molded ½"×½" annealed specimen under ASTM test D-648 and comprising (1) an alphamethyl styrene copolymer containing at least 50% alphamethyl styrene by weight and at least 20% acrylonitrile by weight and (2) a graft polymer prepared by reacting a monomer mixture of from 20-40% acrylonitrile by weight and correspondingly from 80-60% of a monovinyl aromatic hydrocarbon by weight in the presence of a diene rubber, the alphamethyl styrene content of said blend of (1) and (2) being at least 35% by weight, (b) from 35 to 0 parts by weight of a polycarbonate and (c) from about 0.05 to about 0.5 parts of a siloxane polymer having a viscosity of from 200 to 100,000 centistokes and having the following structure:

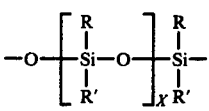

where R and R' are hydrogen, methyl or other alkyl.

7. A metal plated article in accordance with claim 6, wherein the alphamethyl styrene copolymer contains about 66% by weight alphamethyl styrene, about 3% by weight styrene and about 31% by weight acrylonitrile.

8. A metal plated article in accordance with claim 6, wherein the graft polymer contains about 60% polybutadiene rubber, about 28% styrene and about 12% acrylonitrile.

9. A metal plated article in accordance with claim 6, wherein the alphamethyl styrene copolymer contains about 66% by weight alphamethyl styrene, about 3% by weight styrene and about 31% by weight acrylonitrile, and the graft polymer contains about 60% by weight polybutadiene about 28% by weight styrene and about 12% by weight acrylonitrile.

10. A metal plated article in accordance with claim 6, wherein the siloxane polymer is poly(dimethyl siloxane).

* * * * *